United States Patent
Jaakkola et al.

(10) Patent No.: US 6,765,917 B1
(45) Date of Patent: Jul. 20, 2004

(54) DS-0 SYNCHRONIZATION OVER A WIRELESS ATM LINK

(75) Inventors: Alan W. Jaakkola, Kanata (CA); Donna Godin, Gloucester (CA); Brian Wirth, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/324,517

(22) Filed: Jun. 3, 1999

(30) Foreign Application Priority Data

Jul. 27, 1998 (CA) ............................................. 2243888

(51) Int. Cl.$^7$ ........................ H04L 12/28; H04Q 7/00; H04J 3/06

(52) U.S. Cl. .................. 370/395.62; 370/328; 370/350; 370/314

(58) Field of Search ................................. 370/314, 328, 370/329, 330, 336, 350, 395.1, 395.21, 395.51, 395.52, 395.53, 419, 420, 498, 518, 503, 509, 395.62, 395.61, 458, 310, 338; 375/219, 222, 371; 359/137; 455/75, 502

(56) References Cited

U.S. PATENT DOCUMENTS

| | | | | |
|---|---|---|---|---|
| 5,260,978 A | | 11/1993 | Fleischer et al. | |
| 5,751,702 A | * | 5/1998 | Evans et al. | 370/314 |
| 5,914,948 A | * | 6/1999 | Frank | 370/337 |
| 5,936,949 A | * | 8/1999 | Pasternak et al. | 370/328 |
| 5,966,644 A | * | 10/1999 | Suzuki | 455/76 |
| 6,205,144 B1 | * | 3/2001 | Mohrmann | 370/395 |
| 6,243,372 B1 | * | 6/2001 | Petch et al. | 370/350 |
| 6,407,992 B1 | * | 6/2002 | Pasternak et al. | 370/338 |
| 6,522,641 B1 | * | 2/2003 | Siu et al. | 370/338 |
| 6,556,560 B1 | * | 4/2003 | Katseff et al. | 370/352 |
| 6,621,813 B2 | * | 9/2003 | Petch et al. | 370/350 |

* cited by examiner

Primary Examiner—Hanh Nguyen
(74) Attorney, Agent, or Firm—Marks & Clerk

(57) ABSTRACT

A system and method for the transmission of synchronization information from a wireless asynchronous transfer mode (ATM) base station across a point to point or point to multipoint wireless link, to one or more network interface units (NIUs). Each of the NIUs is capable of supporting a combination of structured or unstructured T1 and/or E1 circuit emulation services. The technique involves locking the wireless modem downstream symbol clock to an externally provided frequency reference from the base station. The reference is an N integer multiple of 8 kHz which is the lowest common denominator for both the T1 and E1 clocking rates.

26 Claims, 5 Drawing Sheets

DS-0 SYNCHRONIZATION OVER A WIRELESS ATM LINK

FIELD OF THE INVENTION

This invention relates to broadband wireless communication utilizing an ATM backbone and more particularly to a system and method of providing a T1/E1 or fractional T1/E1 synchronization signal over a wireless link.

BACKGROUND

Local Multipoint Distribution Service (LMDS), known as Local Multipoint Communication Service (LMCS) in Canada, employs microwave frequencies in the 2 GHz to 42 GHz range to deliver broadband services over wireless links. Base transceiver stations (BTS) linked to a broadband network such as an asynchronous transfer mode (ATM) backbone provide a vehicle for transmitting broadband services to customer premise equipment (CPE) at fixed locations within the cell served by the base station. This allows small and medium sized businesses to gain access to broadband services such as voice, video, and data without incurring the costs associated with terrestrial connections such as optical fiber cable, hybrid coax, etc. The wireless link in this context has become known as the 'last mile' solution to accessing developing broadband networks.

In the base station, which may be, for example, a Newbridge 36170 multi-service switch, an ATM Radio Interface Card (ARIC) interfaces with an outside transceiver (OTX), usually roof mounted, to convert broadband digital information received from the ATM backbone to a radio frequency (RF) signal for transmission, point to multi-point, for reception by network interface units (NIUs) at the customers' sites. Each of the NIUs may be linked to a variety of broadband devices at the customer's premise and to a transceiver for communicating bi-directionally with the base station using a point to point protocol.

Because the microwave transmission is basically line of sight the cell or geographical area serviced by a base station is usually not more than a few miles in diameter. The location of the transceivers at both the base station and the customer's premises also has a bearing on the quality of the communication and hence, the effectiveness of the system.

ATM is a packet oriented technology employing fixed length cells and is well suited for the transport of bursty data. In order to serve a wide range of applications, however, ATM must also be capable of transporting constant bit rate (CBR) traffic such as voice. This means that both the ATM source and the ATM destination must be in synchronization in order to avoid loss of data due to a frame slip in the signal received at the destination.

In wired or terrestrial digital systems, clock distribution is hierarchical with the highest stability source located at the highest point in the system. This will typically be a stratum 3, or higher level, reference source. As clocking is passed downwards through the network, each node takes its timing from either a locally generated clock source, typically of lower stability, (stratum 4 for example) or from the higher level stratum network reference. When a node is running on its own local reference, controlled slips periodically occur in the data.

To alleviate this problem, clock synchronization is passed between nodes to allow slip free operation to be realized. This can be done by extracting timing from an incoming link interconnected to a higher stability source or 'out of band' using a dedicated synchronization link to each node.

One method of providing synchronization in a wired network is described in U.S. Pat. No. 5,260,978 which issued Nov. 9, 1993 to Fleischer et al. The technique described in the '978 patent is known as a Synchronous Residual Time Stamp (SRTS).

In a wireless ATM based network the synchronization requirement still exists but the transfer of a clocking signal over a wireless link can be problematic. This is particularly true when the system supports low bandwidth services such as N×DS-0 or fractional T1 or E1 service. For example the aforementioned SRTS technique does not work effectively for structured or fractional T1 and E1 services.

SUMMARY OF THE INVENTION

Accordingly, there is a requirement in broadband wireless systems, and in particular systems capable of low bandwidth services, to develop an effective method of providing synchronization for traffic between a base station and a NIU.

Therefore in accordance with a first aspect of the present invention there is provided a method of providing a synchronization signal between a base station and a remote network interface unit (NIU) in a wireless network the method comprising: deriving a reference signal at the base station, the reference signal having a frequency which represents a common denominator of all transmission rates to be carried by the network; locking the symbol rate of data transmitted between the base station and the NIU to an integer multiple of the reference signal; retrieving the reference signal at the NIU by dividing the symbol rate by the multiple integer and utilizing the reference signal as a synchronization signal.

In accordance with a second aspect of the invention there is provided a system for providing a synchronization signal between a network interface unit (NIU) and a base station over a wireless link comprising: clock means at the base station for deriving a reference signal, the reference signal having a frequency representing a common denominator of all transmission rates of data to be transmitted; means at the base station to generate a data symbol rate for data transmitted therefrom, the symbol rate being an integer multiple of the reference signal; division means at the NIU to derive the reference signal from the symbol rate by dividing the symbol rate by the integer multiple; and means to synchronize the NIU to the base station using the reference signal.

BRIEF DESCRIPTION OF THE DRAWINGS

The invention will now be described in greater detail with reference to the attached drawings wherein.

DETAILED DESCRIPTION OF THE INVENTION

Figure 1:
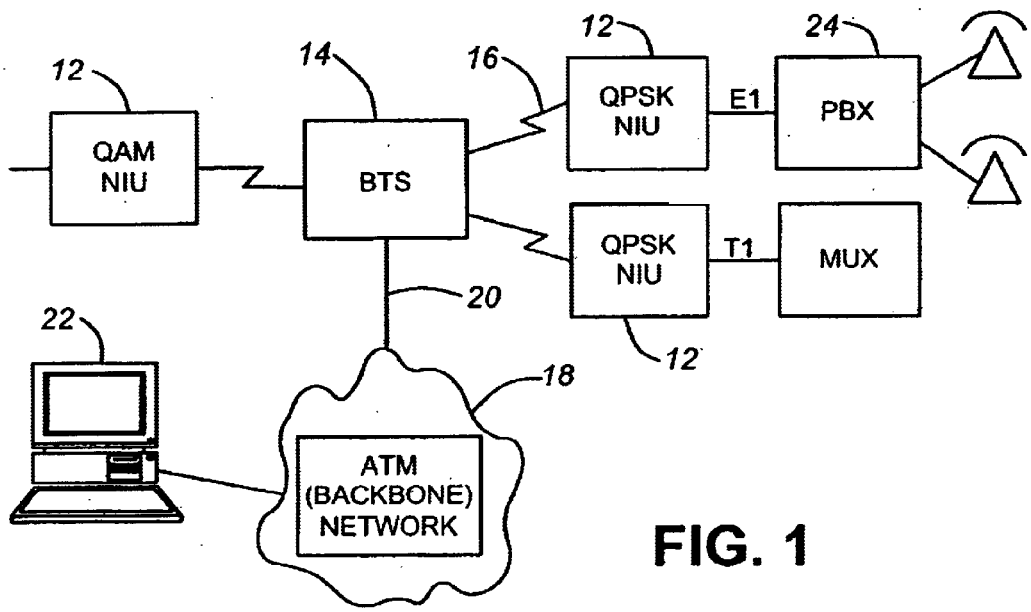
FIG. 1 is a high level diagram of a cellular, broadband wireless system.

FIG. 1 illustrates one implementation of a cellular, broadband wireless system. This implementation incorporates an asynchronous transfer mode (ATM) backbone network 18 and a network manager 22. A base station 14, which may be a multi-services switch such as a Newbridge Networks 36170, is connected to the backbone by a wired connection or a wireless point to point link shown generally at 20. The base station 14 includes a transceiver (not shown) for transmitting and receiving broadband data modulated onto a radio frequency (RF) signal. The RF signal in this implementation will be in the 2 GHz to 42 GHz range depending on the frequency license assigned to the system.

Network interface units (NIUs) 12 located at customer sites are each equipped with a transceiver for bi-directional communication with the base station 14. Communication from the base station to the NIUs (downstream) is point to multipoint and communication from each NIU to the base station (upstream) is point to point. Modulation techniques such as quadrature phase shift key (QPSK) are commonly used. The downstream point to multipoint signal frequently employs a time division multiplexing (TDM) scheme while time division multiple access (TDMA) is used in the upstream point to point signals. A differential quadrature phase shift key (DQPSK) modulation technique is used in the upstream direction. Each NIU 12 at the customer sites is connected with customer premise equipment (CPE) 24 such as, for example, a PBX over a T1 or E1 service or to a computer via an Ethernet link.

Figure 2:
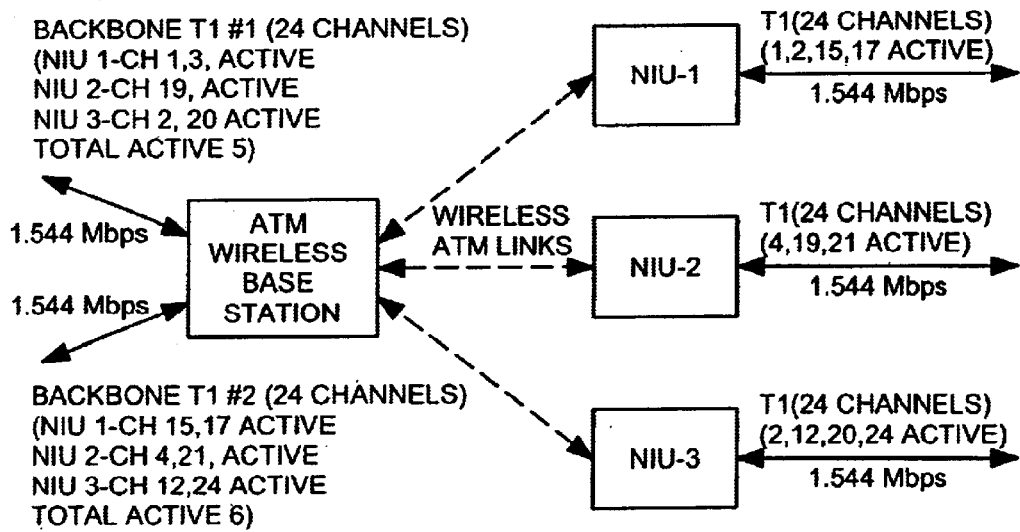
FIG. 2 illustrates the wireless ATM circuit emulation topology according to the present invention.

FIG. 2 relates to T1 service between the backbone network and NIUs 12 through the base station 14 over wireless links 16. T1 service at 1.544 Mbps is equivalent to 24 channels of DS-0 service at 64 Kbps each. In the example of FIG. 2 communication from Backbone T1 (1) and Backbone T1 (2) is mapped unto NIU-1, NIU-2 and NIU-3 over the bi-directional wireless links 16(*a*), 16(*b*) and 16(*c*) respectively.

Figure 3:
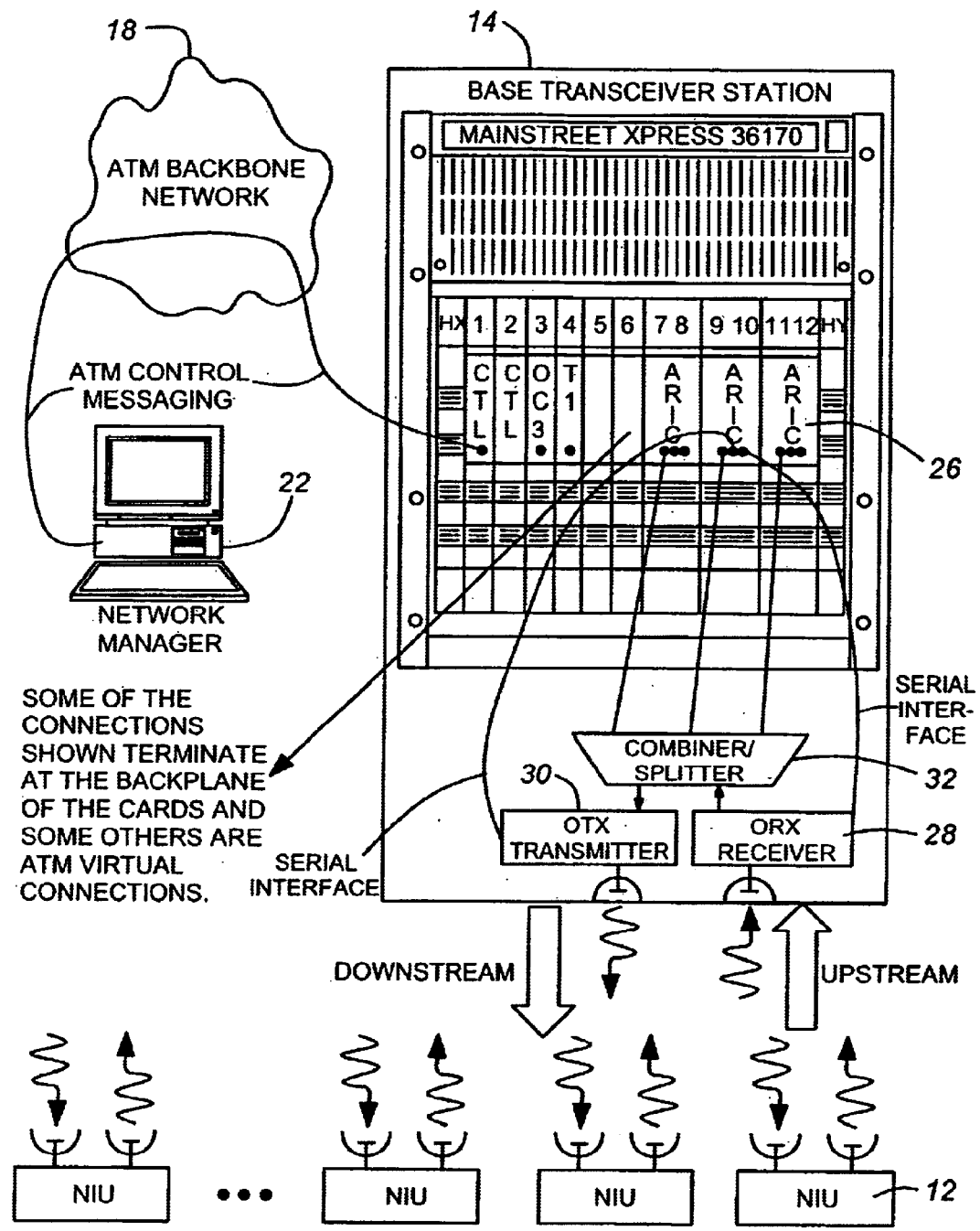
FIG. 3 illustrates functional aspects of the base station ATM switch.

As shown in FIG. 3 one or more ATM radio interface cards (ARIC) 26 are included in the base station switch 14 for interfacing between the ATM backbone 18 and the wireless radio frequency network elements 12. The ARIC 26 includes a modem module (not shown) for modulating and demodulating the RF signal. The upstream signal is received by outside receiver (ORX) 28 and the downstream signal is transmitted by outside transmitter (OTX) 30. The signals pass through combiner/splitter 32 between the ARIC and transmitter 30 or receiver 28.

As indicated earlier synchronization between the base station 14 and NIU 12 is necessary to avoid loss of data in the received signal. The present invention solves this requirement by passing an 8 kHz synchronization signal over a wireless ATM link from the base station 14 to each NIU 12 and consequently to T1 or E1 terminals or fractional T1 or E1 terminals attached thereto. This technique involves locking the wireless modem downstream symbol clock to a frequency reference derived at the base station. This reference is an n-integer multiple of the 8 kHz signal and allows locking the modem modulator symbol rate to a network clock or other network stratum reference.

At the T1 or E1 terminal, the recovered symbol clock in the demodulator is divided by the same n-integer multiple to recover the desired 8 kHz synchronization signal which can then be used to synchronize the T1/E1 interface. Using this technique, multiple remote T1/E1 or fractional T1/E1 services can all be synchronized to an aggregate T1/E1 or higher rate service at a base station over a wireless ATM link to allow slip free multiplexing of these services.

In this invention 8 kHz is used as it is the lowest common denominator for both the T1 and E1 clocking rates and all digital networks use a 125 uS framing rate (8 kHz sampling). For T1 the line rate is 193×8 kHz=1.544 MHz and for E1 the line rate is 256×8 kHz=2.048 MHz.

Figure 4:
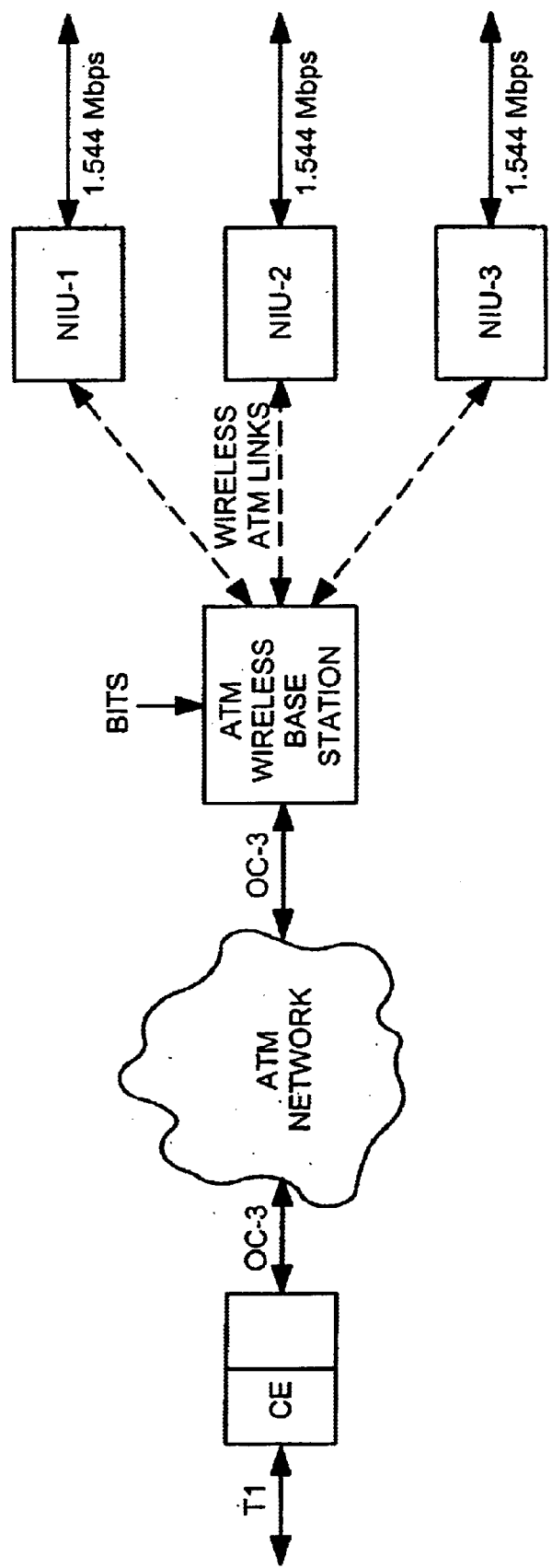
FIG. 4 illustrates the wireless ATM circuit emulation topology of FIG. 2 in a network implementation.

In FIG. 4 the T1 services previously shown in FIG. 2 are extended to a network circuit emulation implementation utilizing endpoints at opposite ends of the network. As shown the ATM wireless base station communicates with the ATM switching fabric via a T1 or OC-3 link. The ATM cloud, in turn, connects to endpoint node which includes a circuit emulation (CE) card. The CE card connects to a terminal (not shown) via a T1 link. The base station includes one or more ARICs for bi-directional communication with the respective NIUs over the wireless links as previously discussed. The NIUs at customer sites are connected to customer premise equipment via T1 connections.

The 8 KHz signal used to synchronize respective end points across the entire network may be derived from different sources. For example, the clock signal may be obtained from an external Building Integrated Timing Supply (BITS) clock at the base station. Alternatively, the 8 KHz reference may be derived from the received OC-3 clock (from the ATM Network) and passed to the NIU for clock recovery using the SRTS algorithm. In any event, the entire network operates on a common clock source to ensure synchronization and to avoid loss of data as previously discussed.

The synchronization technique involves operating the base station modulator at a symbol rate which is an integer multiple of 8 KHz. This is illustrates in the circuit diagram of the base station modulator in FIG. 5. As shown the 8 KHz clock signal is derived in the base station and passed through to the modem (RF modulator) 40. The 8 KHz signal is multiplied by the integer 2083 as will be described in greater detail later.

Figure 5:
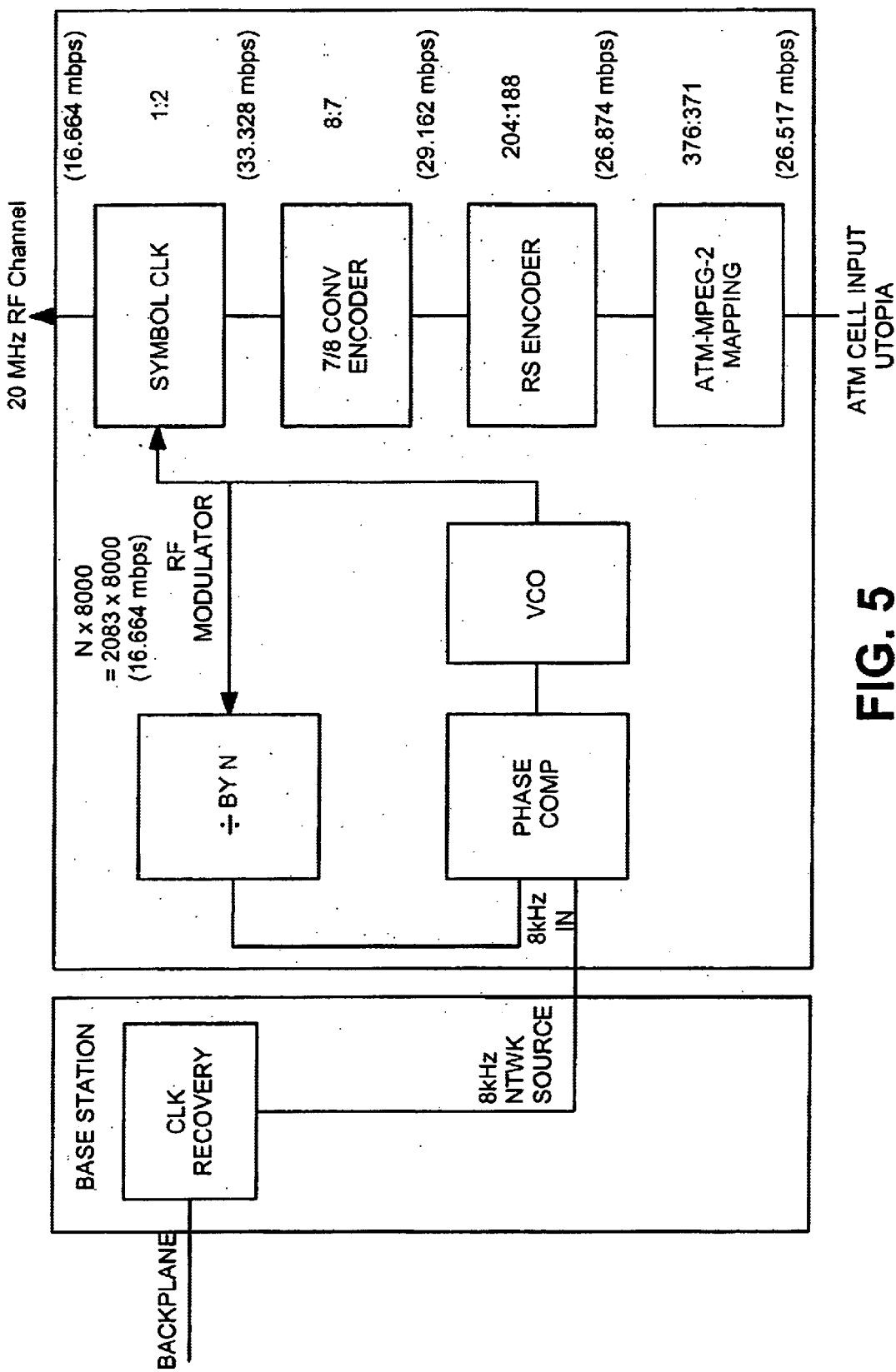
FIG. 5 is a circuit diagram of the base station to modulator synchronization generator.

At each remote NIU (Network interface unit) demodulator, the recovered symbol clock is then divided by the same integer to recover the original 8 kHz sync signal as shown in FIG. 5. This signal is then multiplied by either 193, for T1 or 256 for E1 to provide the necessary synchronous clocking to the T1 or E1 physical facilities connected to the NIU(s).

The recovered clock is also used to recover the data on the incoming side of the link. It is assumed in this case that the NIU is the master clock source for the attached T1 or E1 link, and the connected equipment is slaved to this link.

The choice of down link symbol rate for a wireless ATM link must consider a number of factors, including:

1—The minimum desired ATM rate to be transported in the down link. Since the ATM cell rate is asynchronous, and variable depending on the required service bandwidth of each virtual circuit, and the number of virtual circuits required, the minimum link cell rate must exceed the aggregate payload rate requirement to allow the service(s) to be supported. Links not requiring the minimum aggregate ATM rate (number of services×service bandwidth) have idle cells inserted into the link to maintain the link at a constant transmission rate.

2—The additional forward error correction (FEC) overheads necessary to ensure error free transmission of the ATM packets.

3—The encapsulation overheads if any for transporting the ATM payload (ie ATM to MPEG-2 per DAVIC 3.3). When DAVIC is used three levels of overhead are experienced; ATM-MPEG Encapsulation, Reed Solomon FEC and Convolutional Coding FEC. DAVIC or the Digital Audio Video Council is an association whose purpose is to advance the success of emerging digital audio-visual applications and services.

MPEG (Motion Picture Experts Group) is a compression technique used in producing digital content.

4—The regulatory spectral mask requirements.

5—The chosen modulation scheme.

An example calculation is shown below and illustrated with the values shown in FIGS. 5 and 6. Assume the desired channel bandwidth fc<20 MHz. Assume channel filtering is square root raised cosine with alpha=0.2. From the channel filtering requirements the maximum supportable symbol rate in a 20 MHz channel Rsmax is:

Rsmax<fc/(1+alpha)

Rsmax<16.666 Msps

To support synchronization, the symbol rate must be an integer multiple of 8 kHz.

The required 8 KHz multiplier constant K is then:

K=Int (16.666 . . . Msps/8000)

K=Int (2083.33 . . . )

K=2083

Then the actual operating symbol rate R of the link required to satisfy both the synchronization requirements and the maximum channel bandwidth limitations is:

Rsa=2083×8000

Rsa=16.664 Msps

For QPSK the modulation efficiency Em is 2 bits/symbol

Em=2

The resulting RF bit rate Rrf is:

Rrf=Rsa×Em

Rrf=16.664×2

Rrf=33.328 Mbps

Determine the FEC Overheads

Convolutional coding overhead OHcc at 7/8 coding is

OHcc=8/7

Reed Solomon coding overhead OHrs at 204:188 coding is

OHrs=204/188

Total FEC overhead OHfec

OHfec=OHcc×OHrs

OHfec=8/7×204/188

OHfec,=1.240

Determine the MPEG-2 rate Rmpeg

Rmpeg=Rrf/OHfec

Rmpeg=33.328 Mbps 1.24=26.874 Mbps

Rmpeg=26.874 Mbps

ATM to MPEG-2 overheads 376/371=1.0135

Therefore the maximum ATM rate which can be supported over this link is:

26.874 Mbps×371/376=26.517 Mbps while still maintaining the 8 kHz sync information.

ATM Max=8000×2083×2×7/8*188/204×371/376= 26.517 Mbps.

Figure 6:
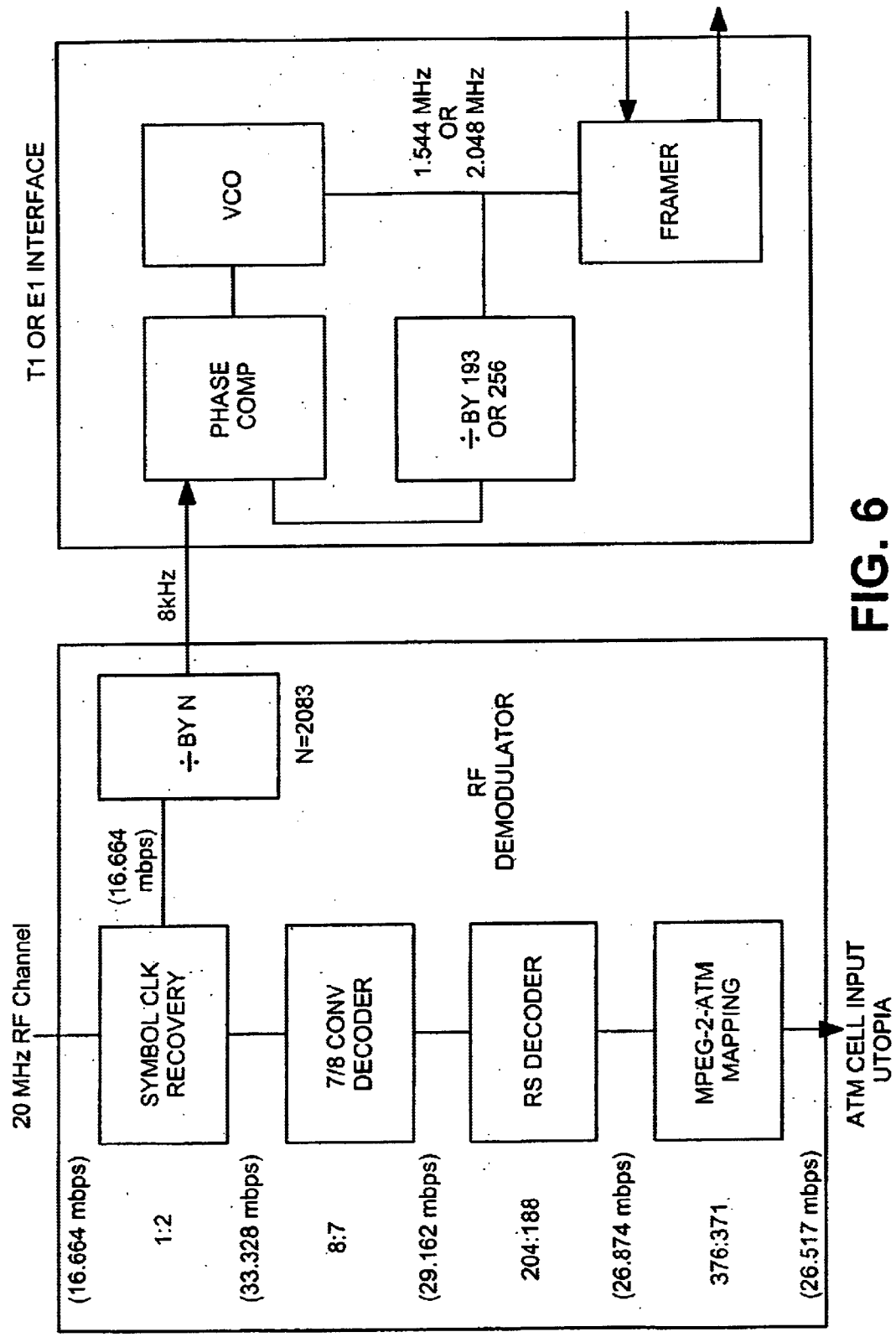
FIG. 6 is a circuit diagram of the network interface unit synchronization recovery topology.

As indicated previously, these values are shown in FIGS. 5 and 6 in relation to the synchronization topology at both the base station and network interface units.

While a particular embodiment of the invention has been described and illustrated it will be apparent to one skilled in the art that numerous alternatives and variations can be implemented. It is to be understood, however, that such alternatives and variations will fall within the scope of the invention as defined by the appended claims.

What is claimed is:

1. The method of providing a synchronization signal between a base station and a remote network interface unit (NIU) in a wireless network comprising: deriving a reference signal at the base station locking the symbol rate of data transmitted between the base station and the NIU to an integer multiple of the reference signal; retrieving the reference signal at the NIU by dividing the symbol rate by the multiple integer and utilizing the reference signal as a synchronization signal.

2. The method as defined in claim 1 wherein said reference signal has a frequency of 8 kHz.

3. The method as defined in claim 2 wherein said transmission rate is 1.544 Mbps (T1).

4. The method as defined in claim 2 wherein said transmission rate is 2.048 Mbps (E1).

5. The method as defined in claim 4 wherein said integer multiple is 193.

6. The method as defined in claim 5 wherein said integer multiple is 256.

7. The method as defined in claim 2 wherein said transmission rate is fractional T1.

8. The method as defined in claim 2 wherein said transmission rate is fractional E1.

9. The method as defined in claim 2 wherein said transmission rate is T3.

10. The method as defined in claim 2 wherein said transmission rate is E3.

11. The method as defined in claim 1 wherein said NIU includes a plurality of fixed wireless terminals and said transmission from said base station to said terminals (downstream) is time division multiplexed (TDM).

12. The method as defined in claim 1 wherein the reference signal has a frequency which represents a common denominator of individual transmission rates carried by said network.

13. A system for providing a synchronization signal between a network interface unit (NIU) and a base station over a wireless link comprising: clock means at said base station for deriving a reference signal means at said base station to generate a data symbol rate for data transmitted therefrom, said symbol rate being an integer multiple of said reference signal; division means at said NIU to derive said reference signal from said symbol rate by dividing said symbol rate by said integer multiple; and means to synchronize said NIU to said base station using said reference signal.

14. The system as defined in claim 12 wherein said reference signal is derived from a Building Integrated Timing Supply (BITS) clock external to said base station.

15. The system as defined in claim 14 wherein said NIU is a T1 terminal for receiving data at a T1 transmission rate.

16. The system as defined in claim 13 including an ATM backbone connected to said base station and communicating therewith over a point to point connection.

17. The system as defined in claim 16 wherein said ATM backbone is connected to a first endpoint having a T1 circuit emulation card and said NIU is connected to a second endpoint having a T1 circuit emulation card.

18. The system as defined in claim 17 wherein said reference signal is derived from said circuit emulation card at said first endpoint.

19. The system as defined in claim 13 wherein said network is an asynchronous transfer mode (ATM) wireless network.

20. The system as defined in claim 19 wherein said NIU is a fixed wireless terminal.

21. The system as defined in claim 20 having a plurality of fixed wireless terminals.

22. The system as defined in claim 13 wherein said reference signal has a frequency of 8 kHz.

23. The system as defined in claim 13 wherein said NIU is an E1 terminal for receiving data at an E1 transmission rate.

24. The system as defined in claim 13 wherein said base station has means to provide error correction to said transmitted data.

25. The system as defined in claim 13 wherein said base station includes means to perform encapsulation to said data to be transmitted.

26. The system as defined in claim 13 wherein the reference signal has a frequency which represents a common denominator of individual transmission rate carried by the network.

* * * * *